United States Patent [19]

Matsunoshita et al.

[11] Patent Number: 4,594,710
[45] Date of Patent: Jun. 10, 1986

[54] DATA PROCESSING SYSTEM FOR PREVENTING MACHINE STOPPAGE DUE TO AN ERROR IN A COPY REGISTER

[75] Inventors: Fumirou Matsunoshita; Kiyosumi Sato, both of Kawasaki, Japan

[73] Assignee: Fujitsu Limited, Kawasaki, Japan

[21] Appl. No.: 561,965

[22] Filed: Dec. 15, 1983

[30] Foreign Application Priority Data

Dec. 25, 1982 [JP] Japan .................................. 57-231867

[51] Int. Cl.⁴ .............................................. G06F 15/16
[52] U.S. Cl. ......................................... 371/16; 371/12; 371/18
[58] Field of Search ........................ 371/12, 13, 14, 66, 371/16, 18; 364/200, 900

[56] References Cited

U.S. PATENT DOCUMENTS

| | | | |
|---|---|---|---|
| 3,229,251 | 1/1966 | Homan | 371/14 |
| 3,757,302 | 9/1973 | Pollitt | 371/14 |
| 4,307,453 | 12/1981 | JuLasz et al. | 371/66 |
| 4,318,172 | 3/1982 | Yamada et al. | 371/12 |
| 4,493,035 | 1/1985 | MacGregor et al. | 371/12 |

Primary Examiner—Michael R. Fleming
Attorney, Agent, or Firm—Staas & Halsey

[57] ABSTRACT

A data processing system comprising an instruction control unit for controlling system operation, a storage control unit for storing data used for the system operation, and a machine check interruption portion for carrying out a machine check interruption when an error occurs during the system operation. The instruction control unit has a system control register group for storing system control data. The storage control unit has a copy register group for storing data copied from the system control data. The instruction control unit further comprises a register save state portion for copying the contents stored in the system control register group into the copy register group during the machine check interruption when an error occurs in the copy register group during the system operation. In this manner, a machine stop due to an error only in the copy register group, is prevented.

4 Claims, 4 Drawing Figures

DATA PROCESSING SYSTEM FOR PREVENTING MACHINE STOPPAGE DUE TO AN ERROR IN A COPY REGISTER

BACKGROUND OF THE INVENTION

1. Field of the Invention

The present invention relates to a data processing system. More particularly, it relates to a data processing system having a system control register group for storing system control data and a copy register group for storing data copied from the system control data, wherein machine stoppage due to an error only in the copy register, can be prevented.

2. Description of the Prior Art

A data processing system conventionally comprises an instruction control unit for controlling the system operation and a storage control unit for storing data used for the system operation. The instruction control unit has a system control register group for storing system control data. The storage control unit has a copy register group for storing data copied from the system control data. The copy register group is used, for example, for converting address signals between logical address signals and real address signals in dynamic address translation (DAT) of virtual machines.

During operation, a change in the contents in the system control register group is accompanied by a corresponding change in the contents in the copy register group.

In the case of an error anywhere else except in the groups, either a retry process for repeating the instruction which has caused the error or a machine check interruption process may be carried out. If the error is corrected during the retry operation or during the machine check interruption, the operation continues and subsequent instructions are executed. If the error is not corrected by the retry operation, a machine check interruption is carried out. If the error is not corrected during the machine check interruption, the operation is terminated to reach a machine stop status.

An error in the system control register group or in the copy register group, however, is serious, regardless of whether it is a soft error or a hard error, since system control is effected by those groups. Therefore, if an error occurs in the register groups, a machine check interruption process is carried out, not a retry process. If the error is not corrected during the machine check interruption process, the error is recognized as a hard error, i.e., an uncorrectable error, and the data processing system falls into a machine stop status.

It is reasonable for an uncorrectable error in the system control register group to lead to a machine stop status. A soft error in the copy register group, however, does not always have to lead to a machine stop status when no error is present in the system control register group and the error in the copy register group is produced during copying. In the prior art, however, soft errors in the copy register group always lead to a machine stop status even when no error is present in the system control register group.

SUMMARY OF THE INVENTION

Accordingly, an object of the present invention is to provide a data processing system in which an unnecessary machine stop status, due to a soft error only in the copy register group, is prevented.

To attain the above object, there is provided, according to the present invention, a data processing system comprising an instruction control unit for controlling the system operation, a storage control unit for storing data used for the system operation, and a machine check interruption means for carrying out a machine check interruption when an error occurs during the system operation. The instruction control unit has a system control register group for storing system control data. The storage control unit has a copy register group for storing data copied from the system control data. The instruction control unit further comprises a register save state means for copying the contents stored in the system control register group into the copy register group during the machine check interruption when an error occurs in the copy register group during the system operation.

BRIEF DESCRIPTION OF THE DRAWINGS

The above object and features as well as other advantages of the present invention will become more apparent from the following description of preferred embodiments with reference to the accompanying drawings, wherein.

DESCRIPTION OF THE PREFERRED EMBODIMENTS

Embodiments of the present invention will now be described.

Figure 1:
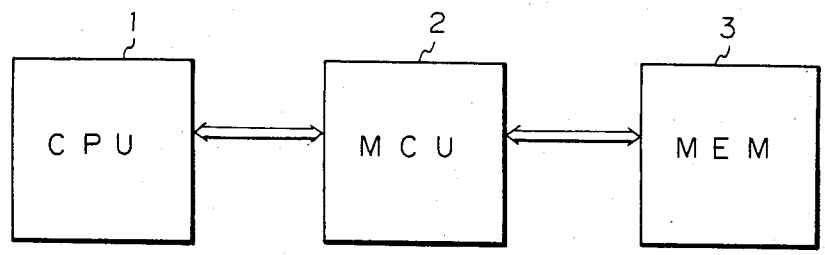
FIG. 1 is a block diagram of a general structure of a data processing system for explaining the background of the present invention.

FIG. 1 shows the general structure of a data processing system for explaining the background of the present invention. A data processing system generally includes a CPU 1, a memory control unit (MCU) 2, and a main memory (MEM) 3. The present invention pertains to the CPU 1.

Figure 2:
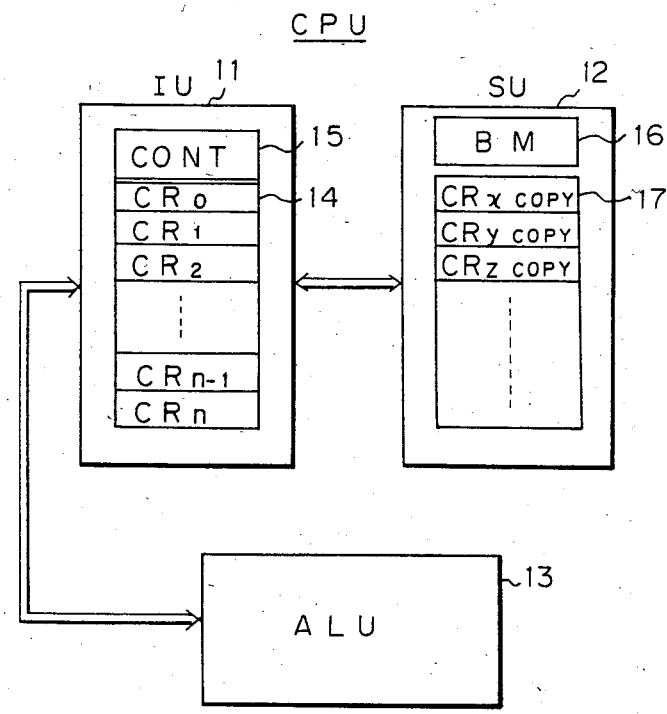
FIG. 2 is a block diagram of a detailed structure of the central processing unit (CPU) 1 in FIG. 1.

FIG. 2 is a block diagram of the detailed structure of the CPU 1 of FIG. 1. In FIG. 2, the CPU 1 comprises an instruction control unit (IU) 11 for controlling the system operation, a storage control unit (SU) 12 for storing data used for the system control, and an arithmetic and logic unit (ALU) 13 for dealing with arithmetic and logical operations.

The instruction control unit (IU) 11 has a system control register group 14 for storing system control data. The system control register group 14 includes a plurality of system control registers CR0, CR1, ..., $CR_{n-1}$, and $CR_n$ and a control portion (CONT) 15 for controlling these system control registers. The storage control unit (SU) 12 has a buffer memory (BM) 16 for temporarily storing data obtained from the main memory 3 (FIG. 1), and a copy register group 17. The copy register group 17 includes a plurality of copy registers CRx, CRy, CRz, ... These copy registers CRx, CRy, CRz, ... are used for storing data copied from the system control data stored in the system control registers CR0, CR1, ..., and CRn, respectively. Therefore, the contents in the copy registers are changed in accordance with the change in the system control registers CR0, CR1, ..., and CRn.

The present invention starts from such a data processing system as described above, in which the CPU has a system control register group and a copy register group.

Figure 3:
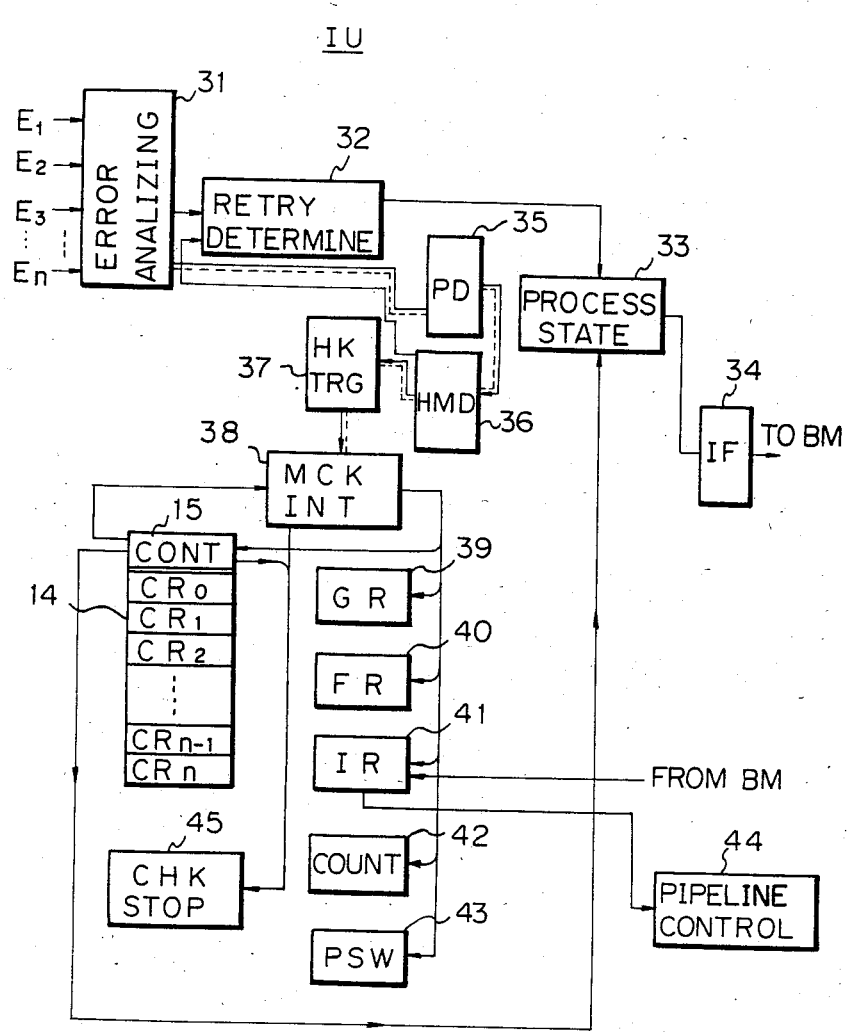
FIG. 3 is a block diagram of a detailed structure of the instruction control unit (IU) in the CPU shown in FIG. 2 according to an embodiment of the present invention.

FIG. 3 is a block diagram of the detailed structure of the instruction control unit (IU) 11 shown in FIG. 2, according to an embodiment of the present invention. In FIG. 3, in addition to the system control register group 14 and the control portion 15, the instruction control unit (IU) 11 includes an error analyzing portion 31 for analyzing an error $E_1, E_2, E_3, \ldots,$ or $E_n$ generated in the data processing system to determine what kind of error it is. A retry determining portion 32 determines whether a retry operation or a machine check interruption is to be executed in accordance with the detected error. A process state setting portion 33 sets status information when the retry operation is to be executed. An instruction fetch portion (IF) 34 fetches an instruction or an operand from the buffer memory (BM) 16 in the storage control unit (SU) 12 in response to the status information from the process state setting portion. A processing damage latch (PD) 35 is set to store the error in response to the output of the error analyzing portion 31, indicating that the machine check interruption is to be executed. A hard machine check detecting portion (HMD) 36 is set in response to the output of the processing damage latch 35, and a hard machine check trigger latch (HK TRG) 37 which is set in response to the output of the hard machine check detecting portion (HMD) 36. A machine check interruption determining portion (MCK INT) 38 determines whether a machine check interruption is to be executed or not. The instruction unit 11 also includes a general purpose function register (GR) 39, a floating point register (FP) 40, an instruction register (IR) 41, a half word counter 42, a program status word (PSW) register 43, a pipeline control portion 44, and a check stop determining portion 45 for executing a machine stop when the error is uncorrectable.

During operation, when an error $E_1, E_2, \ldots,$ or $E_n$ (for example, a parity error), occurs in the data processing system, the error analyzing portion 31 (FIG. 3) determines what kind of error it is.

If the error, for example, $E_1$ is recognized by the error analyzing portion 31 as a correctable error (for example, a one-bit error) or a soft error, the retry determining portion 32 determines to carry out a retry operation, so that status information which enables the execution of instructions, is set in the process state setting portion 33, and the instruction fetch portion (IF) 34 fetches an instruction or operand from the buffer memory (BM) 16 in the storage control unit (SU) 12 (FIG. 2).

Figure 4:
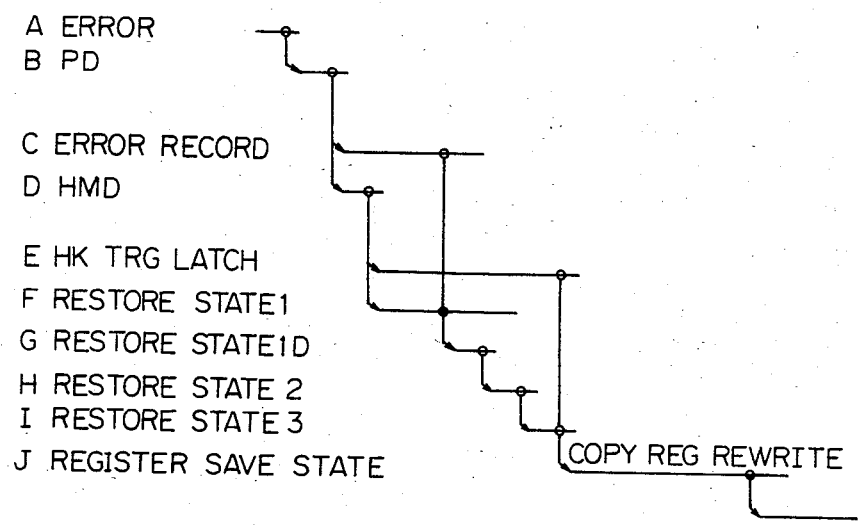
FIG. 4 is a process flow diagram for a machine check interruption according to an embodiment of the present invention.

The machine check interruption process according to the embodiment of the present invention is now described with reference to FIG. 4. In FIG. 4, the symbol o indicates an OR condition and the symbol . indicates an AND condition. If the error detected by the error analyzing portion 31 is recognized as an uncorrectable error or a serious error (FIG. 4A), the error analyzing portion 31 triggers the processing damage latch (PD) 35, so that the uncorrectable or serious error is stored therein (FIG. 4B).

An error in the control register group 14 or in the copy register group 17 is serious because it relates to system control. Therefore, when the error analyzing portion 31 detects such an error in the control register group or in the copy register group 17, the error analyzing portion 31 directly triggers the processing damage latch (PD) 35.

When the processing damage latch (PD) 35 is triggered, it stores the error (FIG. 4C) and triggers the hard machine check detecting portion (HMD) 36 to set it in an on state (FIG. 4D). The output of the hard machine check detecting portion (HMD) 36 is then transferred, through the hard machine check trigger latch (HK TRG) 37 and the machine check interruption determining portion (MCK INT) 38, to the general purpose function register (GR) 39, the floating point register (FP) 40, the instruction register 41, the half word counter 42, and the program status word (PSW) register 43, so as to inhibit writing operation or calculation in these registers, the counter, and the program status word register.

In the next machine cycle, the hard machine check trigger latch (HK TRG) 37 is set (FIG. 4E), whereby the machine check interruption determining portion (MCK INT) 38 determines to execute a machine check interruption process.

The machine check interruption process constitutes the process of a restore state 1, a restore state 1D, a restore state 2, a restore state 3, and, according to the invention, a register save state. The restore state 1 (FIG. 4F) is a state in which an inhibit signal is provided to the storage control unit (SU) 12 so that data fetch or instruction fetch is inhibited. The restore state 1D (FIG. 4G) is a state in which data for calculating an address of the next instruction is stored in a register (not shown). The restore state 2 (FIG. 4H) is a state in which the address of the next instruction is calculated. The restore state 3 (FIG. 4I) is a state in which the calculated address is set in the register (not shown). Based on these restore states 1, 1D, 2, and 3, cancel signals are transferred to, for example, the pipeline control portion 44 so as to empty the contents thereof. Other error analyzing processes are also carried out.

After these necessary machine interruption processes, which themselves are well known, according to the present invention, a register save state process (FIG. 4J) is carried out. In the register save state process, the machine check interruption determining portion (MCK INT) 38 transfers a control signal to the control portion 15 in the control register group 14 so that the control portion 15 controls a copy operation in which the contents of the control register group 14 are copied into the copy register group 17.

After the register save state process, an error analyzing process is executed. In the error analyzing process, when an error in the copy register group 17 is eliminated, the control portion 15 in the control register group 14 transfers a first control signal to the process state setting portion 33 so that status information which enables the execution of subsequent instructions, is set in the process state setting portion 33. As a result, subsequent instructions can be executed without machine stop when an error exists only in the copy register group.

On the contrary, before the present invention, all errors in the copy register group always led to a machine stop.

If the error is not eliminated in the error analyzing process, the control portion 15 in the control register group 14 sends a second control signal to the machine interruption determining portion 38, so that the portion 38 actuates the check stop determining portion 45, resulting in a machine stop, as in the case of an uncorrectable hard error.

From the foregoing description, it will be apparent that, according to the present invention, by providing a register save state means in a data processing system, unnecessary machine stop status due to a soft error only in a copy register group can be prevented.

We claim:

1. A data processing system comprising:
    an instruction control unit for controlling system operation;
    a storage control unit, operatively connected to said instruction control unit, for storing data used for the system operation; and
    machine check interruption means, operatively connected to said instruction control unit, for carrying out a machine check interruption when an error occurs during the system operation;
    said instruction control unit having a system control register group for storing system control data;
    said storage control unit having a copy register group for storing data copies from said system control data;
    said instruction control unit further comprising register save state means, operatively connected to said system control register group and said copy register group, for copying the contents stored in said system control register group into said copy register group during the machine check interruption when an error occurs in said copy register group during the system operation.

2. A data processing system as set forth in claim 1, further comprising means for executing an error analyzing process after said register save state means copies the contents stored in said system control register group into said copy register group.

3. A data processing system as set forth in claim 2, further comprising means for executing subsequent instructions without machine stop when an error in said data processing system is eliminated as a result of the error analyzing process executed by said means for executing an error analyzing process.

4. A data processing system which is capable of performing a machine check interruption process when an error occurs during system operation, comprising:
    an instruction control unit for controlling system operation, said instruction control unit comprising a system control register group for storing system control data;
    a storage control unit, operatively connected to said instruction control unit, for storing data used for system operation, said storage control unit including a copy register group for storing data copied from the system control data stored in said system control register group,
    said instruction control unit further comprising register save state means, operatively connected to said system control register group and said copy register group, for copying the data stored in said system control register group into said copy register group during the machine check interruption, when an error occurs in said copy register group during system operation.

* * * * *

UNITED STATES PATENT AND TRADEMARK OFFICE
CERTIFICATE OF CORRECTION

PATENT NO. : 4,594,710
DATED : JUNE 10, 1986
INVENTOR(S) : FUMIROU MATSUNOSHITA ET AL.

It is certified that error appears in the above-identified patent and that said Letters Patent is hereby corrected as shown below:

Col. 3, line 31, delete "which";
line 49, "error) or a soft error," should be --error or a soft error),--.

Col. 5, line 24, "copies" should be --copied--.

Signed and Sealed this

Ninth Day of September 1986

[SEAL]

Attest:

DONALD J. QUIGG

Attesting Officer

Commissioner of Patents and Trademarks